United States Patent [19]
McDuffie

[11] Patent Number: 5,797,528
[45] Date of Patent: Aug. 25, 1998

US005797528A

[54] ADJUSTABLE ENCLOSURE FEATURING DRY STORAGE

[76] Inventor: Steve McDuffie, Rte. 5, Box 505, Lumberton, N.C. 28358

[21] Appl. No.: 609,606

[22] Filed: Mar. 1, 1996

[51] Int. Cl.$^6$ ..................................................... A45F 5/00
[52] U.S. Cl. .................. 224/148.4; 224/610; 62/457.1; 62/457.7; 220/903; 150/154
[58] Field of Search ............................ 224/148.1, 148.2, 224/148.4, 148.5, 250, 610, 611, 612, 616, 617, 660, 664; 62/457.1, 457.7; 2/211, 323, 338, 309, 76, 237; 220/903, 720, 6, 7, 666, 671; 383/39; 190/111; 206/217, 428, 432; D3/229

[56] References Cited

U.S. PATENT DOCUMENTS

| | | | |
|---|---|---|---|
| D. 227,043 | 5/1973 | Van Den Berg | D3/229 |
| D. 292,056 | 9/1987 | Decker, Jr. et al. | D7/77 |
| D. 304,890 | 12/1989 | Canaan | 224/148.5 |
| D. 316,012 | 4/1991 | Christopher | D7/605 |
| D. 335,957 | 6/1993 | Cantrell et al. | 224/148.5 |
| 367,996 | 8/1887 | Nathan | 224/684 |
| D. 373,678 | 9/1996 | Haigis | D3/229 |
| 1,208,728 | 12/1916 | Bartlett et al. | 224/148.5 |
| 2,775,872 | 1/1957 | Bell | 62/457.2 |
| 3,065,944 | 11/1962 | Liebendorfer | 224/148.5 |
| 4,139,130 | 2/1979 | Glusker et al. | 224/148.2 |
| 4,197,890 | 4/1980 | Simko | D3/229 |
| 4,282,279 | 8/1981 | Strickland | 220/903 |
| 4,468,933 | 9/1984 | Christopher | 62/457 |
| 4,765,472 | 8/1988 | Dent | 206/373 |
| 4,880,315 | 11/1989 | Berry et al. | 383/39 |
| 4,967,986 | 11/1990 | Schildkraut | 224/250 |
| 4,993,551 | 2/1991 | Lindsay | 206/373 |
| 5,140,833 | 8/1992 | Whalen | 62/457.7 |
| 5,174,447 | 12/1992 | Fleming | 206/373 |
| 5,209,385 | 5/1993 | Ledesma | 383/39 |
| 5,329,778 | 7/1994 | Padamsee | 62/457.2 |
| 5,445,315 | 8/1995 | Shelby | 220/903 |
| 5,582,028 | 12/1996 | Rilling et al. | 62/457.4 |

FOREIGN PATENT DOCUMENTS

| | | | |
|---|---|---|---|
| 1054590 | 2/1954 | France | 150/154 |
| 2363258 | 12/1989 | France | 220/903 |
| 390537 | 4/1933 | United Kingdom | 2/237 |
| 697622 | 9/1953 | United Kingdom | 2/237 |

OTHER PUBLICATIONS

Tupperware® Catalog, Fall 1995, Pages showing "Earthquake Tumbler Tote".

*Primary Examiner*—J. Casimer Jacyna
*Assistant Examiner*—Gregory M. Vidovich
*Attorney, Agent, or Firm*—Michael E. Mauney

[57] ABSTRACT

A device with at least one pocket to provide extra storage to be used as an accessory to enclose items used in recreational activity. When sized to enclose a drink can or bottle, the device will have pads to provide insulation and floatation and have an extra compartment for storage of thin flat items like, money, checks, or paper. When the device is sized to fit around a cooler, it will be provided with a shoulder strap arrangement to provide hands-free transportation of the cooler enclosed by the storage device.

11 Claims, 5 Drawing Sheets

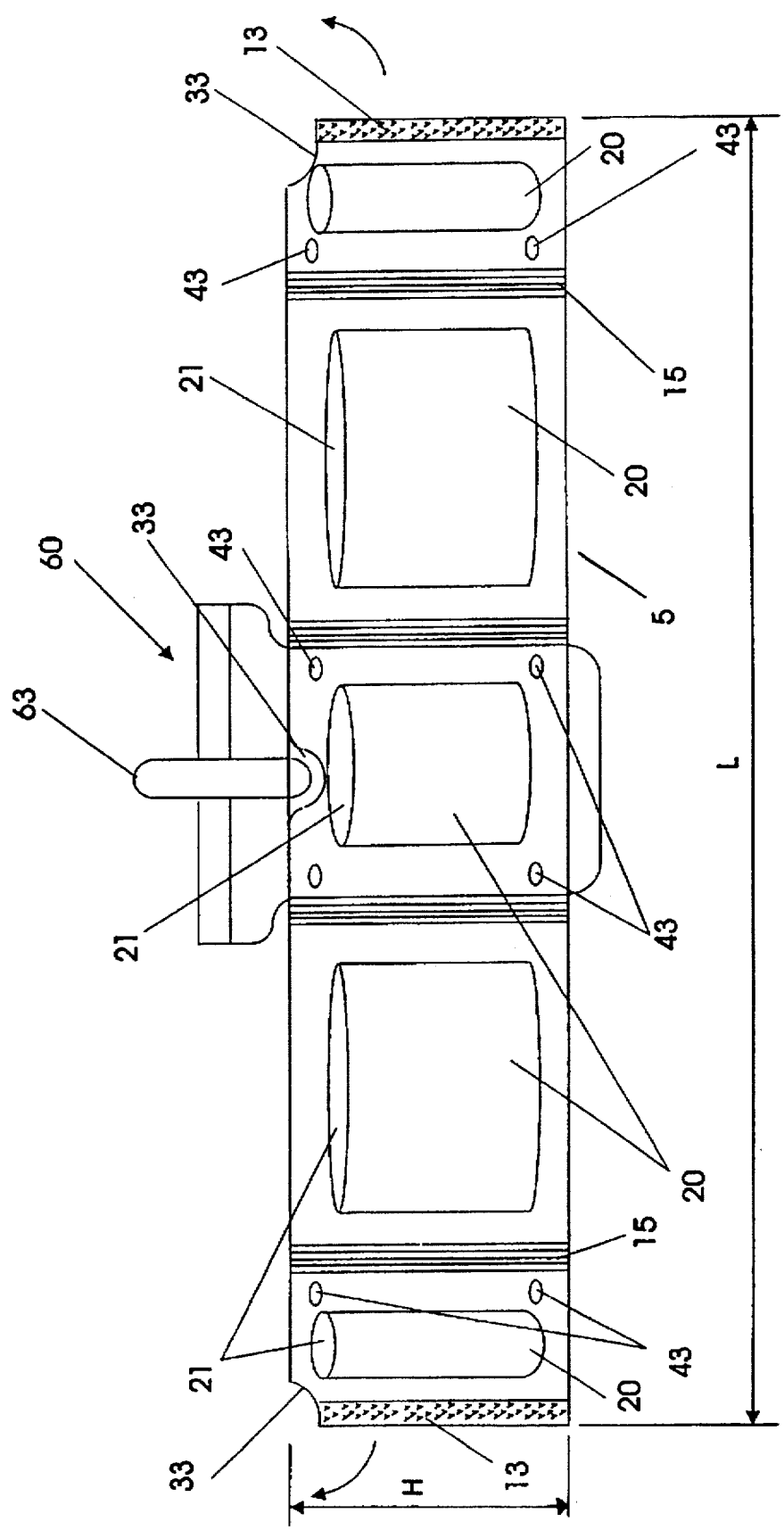

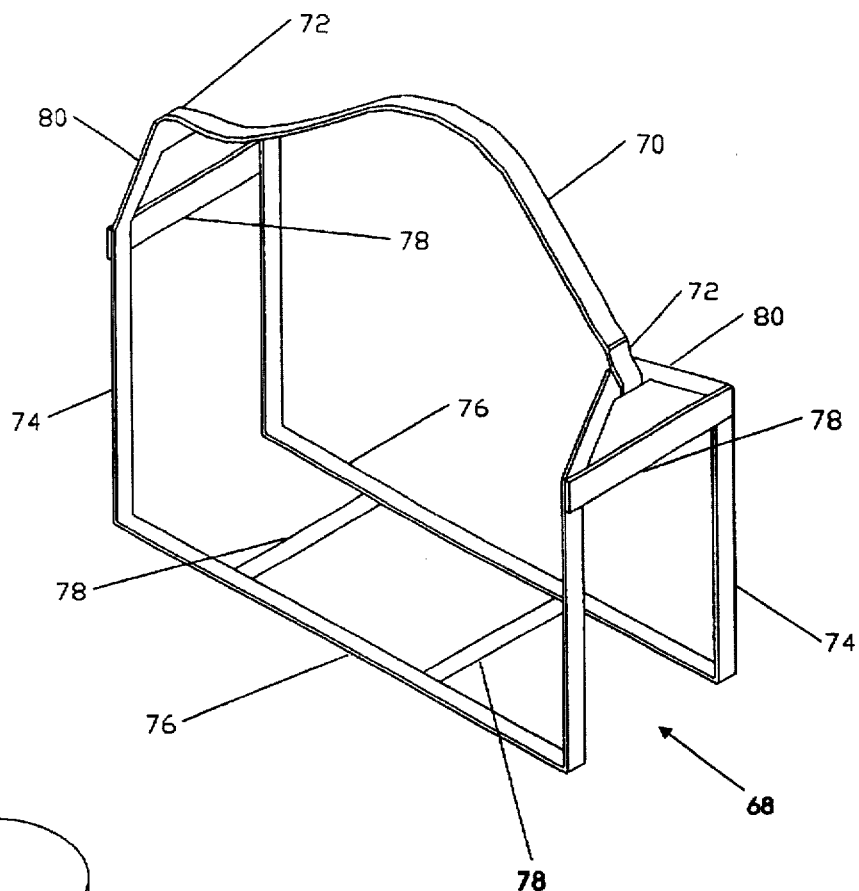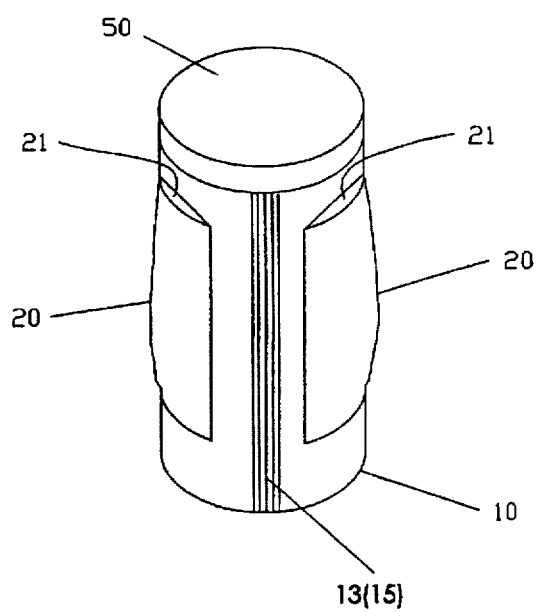

5,797,528

ADJUSTABLE ENCLOSURE FEATURING DRY STORAGE

BACKGROUND OF THE INVENTION

1. Field of the Invention

This invention relates to an adjustable enclosure accessory featuring storage compartments that fits around items used in recreational activities, thus providing convenient storage for the user.

2. Description of Related Art

People engage a variety of recreational activities. Sometimes these activities require accessories—one example of such activity is fishing where a fisherman may wish to have a knife, and extra equipment like leaders or hooks, food, or even electronic devices like radios or cameras with him when he is fishing. Usually a fisherman will carry a cooler along on a fishing trip which may contain canned drinks, food and may be used to store the fisherman's catch until it can be cleaned and either frozen or eaten. Another recreational activity is simply sunning oneself at the beach. Usually people sunning themselves will be wearing a bathing suit without pockets or other storage needed to carry such items as sunglasses, cigarettes, matches, wallets, keys, money or the other things that a person may need while on the beach, but may not wish to return to either their room or to their car to obtain.

When people are at the beach, they often have a cold canned or bottled drink of some sort with them. Sometimes they take a cooler to store these drinks, but often they just have a single drink. However, a cold drink will quickly become cool, then tepid at the beach because of the heat, the sun and the breezes that are usually present at the beach. Consequently, there are polyfoam enclosures sized to fit the usual twelve to sixteen ounce can or bottled drink. These foam enclosures provide insulation to keep the drink at its original temperature longer than would be the case without the insulating property of the foam. However, these enclosures do not provide any storage for such small items as keys, matches, cigarettes, identification or money. Most people like to carry money with them at the beach and certainly their keys. The need to store these items is not met by the polyfoam insulating enclosures used around drinks or cans.

A different problem arises where portable coolers are used to store beverages, foodstuffs, or other perishable items in recreational activities like picnics, trips to the beach or fishing trips. Typically, a portable cooler is made of insulated durable plastic or metal. It maybe irregularly shaped, although ordinarily it is somewhat boxlike and typically has a lid which may be attached or removable, with the lid featuring a handle across the top to carry the cooler. Coolers vary widely in size from those having an inner volume of only one or two quarts up to those having an inner volume of over 150 quarts. Coolers larger than 100 quarts of inner volume are usually used in commercial applications and may require more than one person to carry them unless empty. At the opposite end of the spectrum of sizes of coolers are small personal coolers usually sized to carry six to twelve beverage cans. These are usually termed "personal coolers". Usually the cheapest and most effective way to cool the contents of a cooler is by use of ice. Ice is widely available from commercial outlets in plastic bags usually weighing eight to ten pounds. Additionally ice may be taken from a home freezer in the form of cubes or plastic bottles of water may be frozen and placed within the cooler to serve the same purpose as a bag of ice would serve. However, as ice melts, water may leak either from the ice bag, or from the plastic container, or there will be condensation on the outside of the ice container. This all results in water accumulating in the bottom of the cooler. Some material kept in the cooler such as cans, foodstuffs and the like are packaged so that exposure to water will not damage them. However, there are many items which are used in a recreational context which can be damaged by water, including such things as electronic instruments, paperback books, or cigarettes. Additionally, it is convenient to have access to immediately needed items without having to open the cooler to get to these items. Accordingly, it recognized that it is useful to have a storage area apart from the cooler where items that may be damaged to exposure to cold or to wet may be stored. For example in U.S. Pat. No. 5,140,833 an attachable storage container is disclosed which also incorporates a locking cable to attach the cooler to an immobile object to prevent theft of either the storage case or the cooler contained within the storage case. Similarly U.S. Pat. No. 4,468,933 discloses a portable cooler with an insulated jacket with pockets that communicate with the interior of the cooler. Accordingly, it would be an advance in the art to provide an adjustable storage enclosure accessory sized so that it may be used with items in a range of sizes so as to provide dry storage of materials which for convenience sake may wish to be carried by a person engaging in a recreational activity.

In the first embodiment of this invention this would take the form of a flexible, adjustable, floatable wallet-like enclosure insulated and sized so as to fit around a drink bottle or can which would enable one to carry small personal items such as keys, matches, cigarettes, or money with them to a beach or other activity while also providing insulation for the can or bottle which the enclosure adjustably attaches thereto. The second embodiment of this invention provides an adjustable storage enclosure which will fit coolers of different sizes and shapes, and features a shoulder strap so that the cooler may be carried while leaving the hands free for carrying other items.

BRIEF SUMMARY OF THE INVENTION

Accordingly the first embodiment of this invention is a flexible enclosure which will foldably, adjustably, enclose a drink can or bottle. The storage enclosure may be made of flexible plastic, woven, or other material and features insulating material such as polyfoam or styrofoam beads built into the storage enclosure which provides insulation for the drink enclosed and provides flotation for the storage enclosure. It is anticipated that this storage enclosure would be used frequently in beach or boat applications, where there is an ever present danger of storage enclosure being dropped into the water. If it floats, then it may be easily retrieved from the water. The storage enclosure should have a way of adjusting to fit different size containers within a range of sizes. Straps, buckles, staggered buttons, and the like all would provide means for adjusting the size of the storage enclosure. However, the simplest and most effective means of adjusting the size of the enclosure is by the use of elasticized material. This storage enclosure is constructed of material that will either be stretchable and/or have incorporated within it elastic panels which will allow the storage enclosure to adjustably fit around a variety of sizes of bottles and cans. It may be constructed as a one piece loop shape. Also, it may be a rectangular shape so that one end of the storage enclosure will attach to another end of the storage enclosure either by snaps, zippers, or in most applications by the commercially available hook and eye arrangement known by the trade name of "Velcro" so as to enclose the bottle or can to which the storage enclosure is affixed. The rectangular shape could adjust by means other than elasticized material including straps with buckles, staggered connecting means, bungee cord, or the like. This provides insulation for the can or bottle combined with the convenience of carrying the can or bottle with the accompanying storage by using only one hand. This flexible fabric enclosure has small storage compartments on the outside of the enclosure. The enclosure also features an inner compartment for currency, checks, or similar sized items. When not used with a bottle or can, the enclosure can be used as a wallet.

The second embodiment of this invention will be sized to fit a variety of different coolers of approximately the same volume. It is obvious that one storage enclosure cannot easily be sized to fit both a ten quart and a one hundred quart cooler. However, most "personal" coolers are in the eight to twelve quart range. One size storage enclosure can be designed adjustably to fit most commercial embodiments of coolers having volumes that differ by only a few quarts. For example, it is believed that one size adjustable storage enclosure can be made to adjust to fit most of the eight to twelve quart personal coolers available on the market. One example of a personal cooler is manufactured by the Igloo Corporation of Houston, Texas. This personal cooler has an attached lid which slides either to the left or the right and the body of the cooler is shaped as an inverted truncated triangle when seen in cross section. Other coolers of approximately the same size are more rectangular in shape. However, coolers of approximately the same capacity have approximately the same dimensions. Therefore, a storage enclosure can be constructed from a durable rugged woven fabric of which at least a portion is elasticized so that the storage enclosure will stretch to closely fit around the cooler and stay in place by a frictional fit. The size of the storage enclosure could also be adjusted by means of straps, buckles, staggered buttons, and the like. However, it is believed that elasticizing a portion of the construction material is the simplest and best way of assuring at least some degree of adjustability for the size of the container that the storage enclosure encloses. As with the can sized enclosure, it may be constructed as a continuous loop or as a rectangular shape whose opposing ends attach to each other to form a loop. The adjustment feature could be accomplished a variety of ways including straps and buckles, staggered connecting means, bungee cord, and the like. The item enclosed fits within the loop shape. Because the storage enclosure is constructed of flexible materials, it can enclose rectangular, square, circular or odd shaped coolers. As an additional feature it is easy to attach a carrying strap. The carrying strap will pass underneath the cooler or other item enclosed by storage enclosure. This ensures that the cooler or other item enclosed can be securely carried by the shoulder strap even when the item being carried is heavily loaded. This carrying strap will enable to cooler to be carried by the shoulder strap across the shoulder, thus leaving both hands free for transportation of other items such as beach chairs, umbrellas, fishing rods, tackle boxes and the like.

It is the object of this invention to provide a dry storage enclosure for use in recreational applications. One embodiment is for use with a canned or bottled drink. One embodiment is for use with a portable cooler or ice chest within a range of sizes. In the first embodiment of this invention it is a further object to provide flotation and insulation. In the second embodiment of this invention it is a further object to provide a shoulder strap for "hands free" transportation of the cooler enclosed within the adjustable storage enclosure.

BRIEF DESCRIPTION OF THE DRAWINGS

FIG. 4 shows the cooler storage enclosure in a one piece rectangular embodiment.

FIG. 5 shows a shoulder strap arrangement for use with the cooler storage enclosure.

FIG. 6 shows a loop shaped can size storage enclosure in place around a can.

DETAILED DESCRIPTION OF THE DRAWINGS

Figure 1:
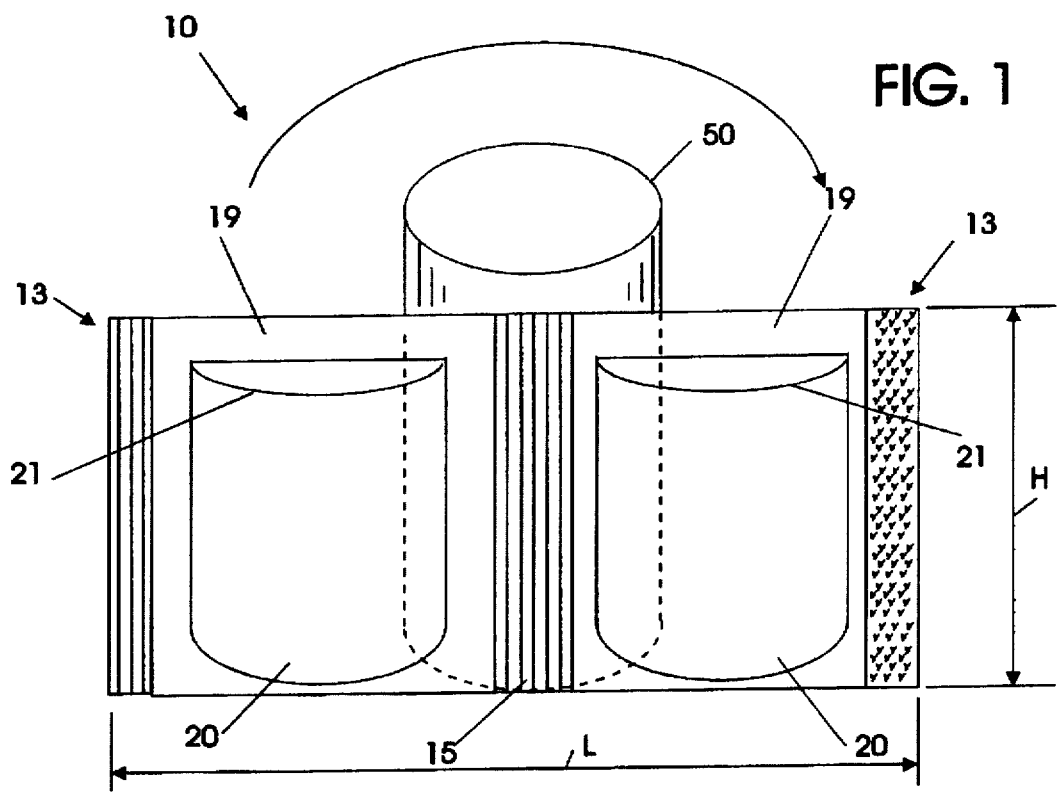
FIG. 1 shows the can size storage enclosure as seen from the front.

FIG. 1 shows the storage enclosure (10) sized to fit a can or drink when constructed in a rectangular shape. The vast majority of canned drinks and bottled drinks come in a relatively standard size diameter. This diameter is most likely determined by manufacturing convenience and by the need to have a can or bottle size that may be conveniently held by people in their hands. Although there is a wide variation in the size of people's hands, that variation takes place within a relatively small range. That is, it is rare to see a hand that is less than ten centimeters (4 inches) in length measured from the butt of the palm to the end of the middle finger or greater than 30 centimeters (12 inches) in length. Most drink cans and bottles are approximately twenty-one to twenty-three centimeters (8½ to 9 inches) in circumference. Therefore, a lengthwise dimension (L) for this invention is usually approximately twenty-one to twenty-four centimeters (7.9 inches to 9.44 inches). The height of the invention (H) is usually approximately eight to ten centimeters. At each end of the invention there is a strip of stretchable material (13) equipped with a hook-and-eye fastening material known by the trade name "Velcro". When seen from the front as in FIG. 1 only a portion of the hook and eye fastening material is visible. Disposed in the middle of this device and running in a height wise direction is a band of highly flexible material (15). Because the hook-and-eye fastening means is also mounted on stretchable material, this provides enough highly stretchable material to provide a wide range of adjustment, so that the storage enclosure will stretch enough in the lengthwise dimension (L) so as to fit the around outside of most can and bottle sizes. Two patch pockets (20) are disposed in the middle of the device. The height of these pockets are slightly less than the height of the device itself. Hence, the pockets (20) will be approximately seven to nine centimeters (2.76 inches to 3.54 inches) in height. The width of the pockets are slightly less than the panels on which they are mounted. These mounting panels (19) are approximately eight centimeters (3.15 inches) wide and eight to ten centimeters (3.15 inches to 3.94 inches) in height. The mounting panels (19) are made of a woven flexible material as are the pockets (20). A variety of fabrics are commercially available in the marketplace, which are not only flexible but are also stretchable. Using material of this type will increase the lengthwise adjustability of the storage enclosure (10). It is anticipated that each pocket would have an elasticized top (21) which would close on its own. If some item has a dimension somewhat larger than the pocket is deep, then the elasticized top would act to hold the item in place in the storage compartment (20) in the storage enclosure (10). The storage enclosure (10) folds around a can (50) in the direction indicated by the directional arrows in FIG. 1. The two hook and eye fastening strips (13) disposed at opposite ends will mate on the far side of the can (50). The stretchable panel (15) will stretch as shown by the arrows making sure the hook and eye fastening strips (13) will mate to complete the enclosure. It will be readily appreciated that the two ends that attach by means of a hook and eye arrangement could be permanently affixed to each other so that the storage enclosure is loop shaped. The can would slide into the opening created by the loop at either the top or bottom of the opening. This construction may be preferable in some applications and be cheaper to make.

Figure 2:
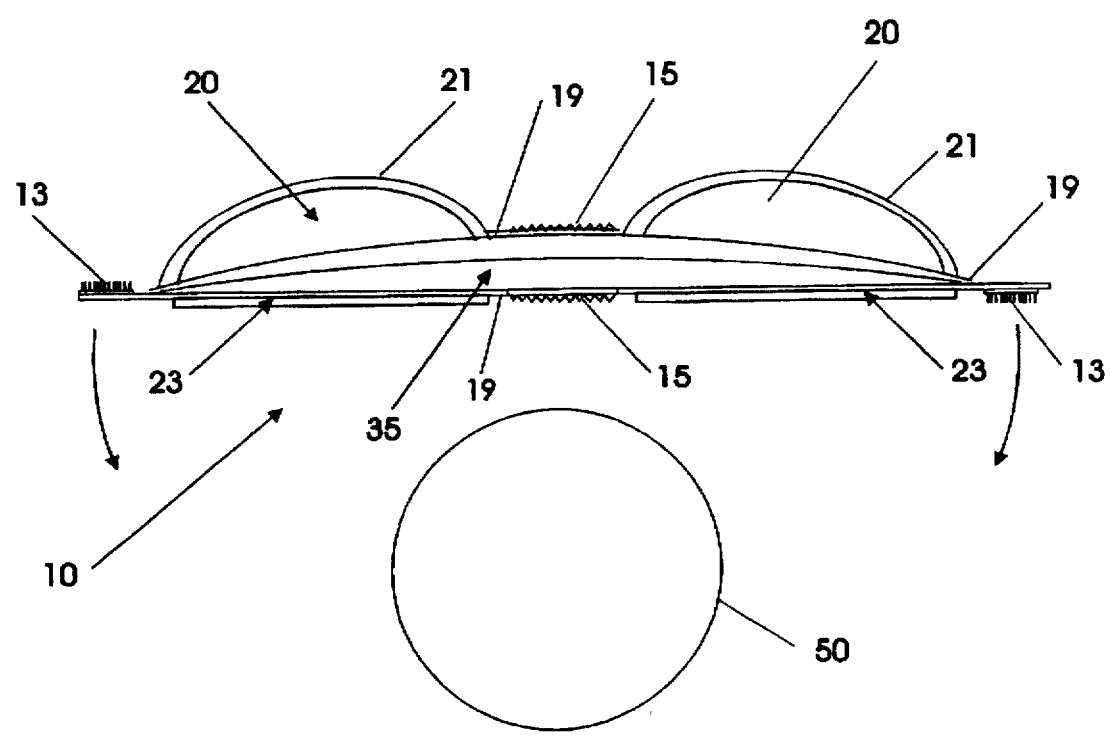
FIG. 2 shows the can size storage enclosure as seen from the top.

FIG. 2 shows the storage enclosure (10) as seen from the top. This view discloses a storage compartment (35) lying between the front and rear pieces of the storage enclosure (10). The hook and eye fastening strips (13) and the elasticized middle panel (15) is seen in both front and rear fabric panels (19). Shown for the first time in this figure are the insulating flotation foam panels (23) which are placed on the inside of the rear fabric panel (19). The purpose of the storage compartment (35) is to provide a wallet-like enclosure between the front and rear panels (19) of storage enclosure (10). This will allow paper money, checks, or other relatively flat, foldable items to be placed within this enclosure and stored for use as needed. The storage enclosure folds as is shown by the directional arrows so as to enclose the can (50).

Figure 3:
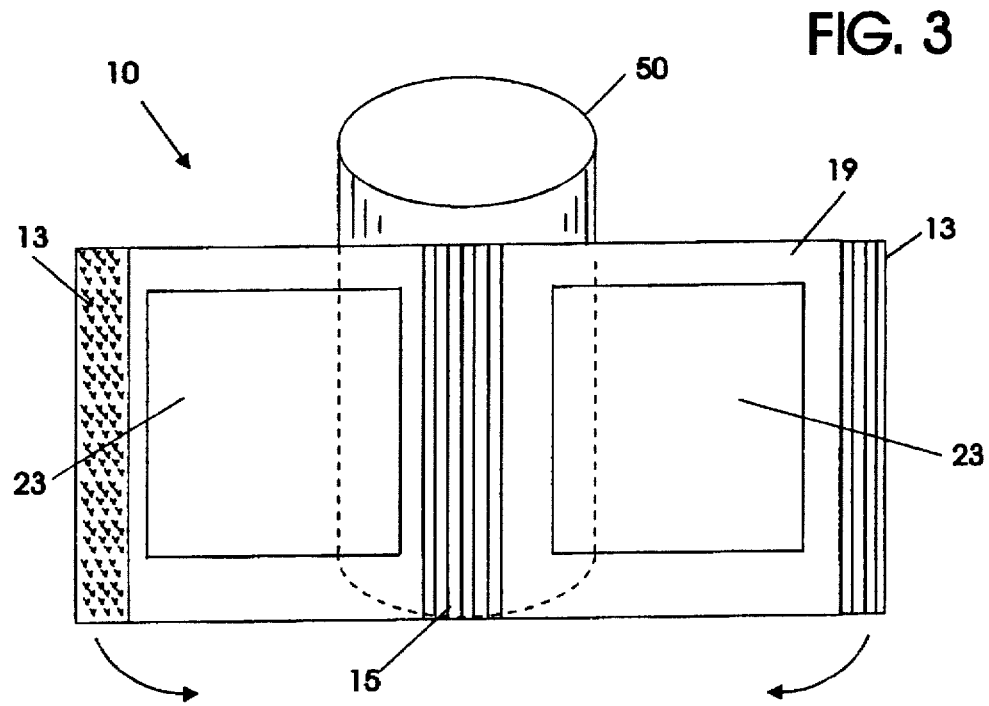
FIG. 3 shows the can size storage enclosure as seen from the rear.

FIG. 3 shows the can size storage enclosure (10) as seen from the rear with the can (50) to be enclosed between the viewer and the storage enclosure (10). As before, on each end there are strips of hook and eye fastening material (13). In the middle of the storage enclosure (10) is a two centimeter (0.79 inches) by ten centimeter (3.94 inches) strip (15) of highly flexible, stretchable material which is used to increase the adjustability of the can size storage enclosure. Disposed between the stretchable mounting strip (13) for the hook and eye fastening means and the middle stretchable panel (15) are two flexible fabric panels (19) that are approximately ten centimeters (3.94 inches) by eight centimeters (3.15 inches). Mounted to these are foam pads (23). These foam pads will mount next to and will foldably enclose a can or bottle enclosed within this device. These pads provide insulation for the can or bottle. Preferably, these pads will be made of a polyfoam or other flexible foam material having a plurality of air holes disposed within the foam material, which provide an insulating quality, as well as a flexible soft feel to the foam. The foam pads will be approximately the same size as the woven panels (19) on which they are mounted. The thicker the foam panels, the greater the insulation and floatation provided by the foam panels. But at the same time, the thicker the foam panels the more difficult it is to effectively mount the device around a bottle or can. It is anticipated that the foam panels will be no more than one centimeter (0.39 inches) in thickness. In FIG. 3 the can (50) is between the viewer and a portion of the storage enclosure (10) so the intervening part of the can (50) is cut away and indicated by dotted lines. The storage enclosure (10) folds toward the viewer as shown by the directional arrows. The hook and eye fastening strips (13) join to complete the enclosure on the side of the can closest to the viewer.

It will be appreciated that there is a wide variety of materials available to construct this device to achieve the stated objectives of providing a foldable, stretchable storage enclosure for a drink or bottle that also provides insulation and floatation. By way of example and not limitation, the hook and eye fastening means could be replaced by buttons, zippers, snaps, or plastic or metal clips. In a similar fashion, there are a variety of choices that could be made in terms of the materials used for the construction of this device and used to achieve its function of adjustment to a variety of sizes of bottles or cans. It will be appreciated by one of ordinary skill in the art that these choices can be made without departing from the underlying function of this invention. It will also be appreciated that the storage enclosure could be constructed to form a continuous loop shape disposed so that the drink container will fit within the opening defined by the loop.

FIG. 4 shows the cooler size embodiment in this invention without a shoulder strap. This device may be used on a variety of cooler sizes. The cooler sizes are largely determined by their internal volume. Thus, a "sixty quart" cooler will be larger than a "thirty quart" cooler. Further, different manufacturers design their coolers somewhat differently. They are generally of a rectangular box-like shape, although ordinarily, the dimensions of the cooler at the top portion are somewhat larger than the dimensions of the cooler at the bottom portion. Thus, seen in cross section the body of the cooler is often seen as an inverted, truncated pyramid, although the slope of the sides from the top to the bottom is gentle.

FIG. 4 shows one construction of the cooler size storage enclosure (5). It will usually be constructed primarily of woven fabric material. The length (L) of the cooler size storage enclosure is slightly smaller than the length of all four sides of the cooler (60) for which the storage enclosure would be sized to fit. At opposite ends of the cooler size storage enclosure (5) are hook and eye fastening means (13) (known by the trade name of "Velcro"), arranged to mateably attach to each other. The hook and eye fasteners are mounted on strips of elasticized stretchable material. The height (H) of the cooler size storage enclosure (5) is somewhat smaller in dimension as the height of the cooler (60) to be enclosed. The storage compartments (20) are patch pockets with an elasticized top (21). Strips (15) of highly flexible, stretchable elasticized material are disposed between two side panels and the end panel of the cooler size storage enclosure. The one end panel of the cooler size storage enclosure (5) has a patch pocket (20) of similar construction, although not as wide as the patch pockets on the side panels. There is an arc shaped cut out portion (33) on the end panel as well as on the velcro strips (13). This provides a place for the handle (63) or top attachment common on most coolers (60). Additionally, on the end panels there are slits (43) so that a carrying strap may be attached to the cooler caddy, so that the cooler itself may be carried by means of a detachable shoulder strap which may be used with the cooler size storage enclosure, which provides extra convenience and hands-free carrying for the cooler.

The cooler size storage enclosure folds around the cooler in the direction shown by the arrows in FIG. 4. The two strips of fastening material (13) meet at the opposite end of the cooler and attach to each other. The areas of highly elasticized stretchable material (15) will stretch to provide a frictionally tight fit of the cooler size storage enclosure around the cooler once the fastening strips (13) are attached to each other. Once the fastening strips (13) of the storage enclosure are folded toward each other and attached, the storage enclosure forms a tightly fitting loop around the cooler enclosed. In some circumstances, especially for smaller coolers, the storage enclosure may be constructed in a loop shape. The elasticized material from which the loop shaped storage enclosure is constructed provides enough stretch to allow the storage enclosure to adjust to different sized and shaped coolers within a relatively narrow range. This eliminates the need for attachment means at the ends of the storage enclosure and can reduce the overall costs of manufacture. Once the storage enclosure is around the cooler, items may then be stored in the pockets (20) disposed on all four sides of the cooler size storage enclosure. In many circumstances the storage enclosure will be carried with the cooler by means of the cooler handle (63). However, in circumstances where it is useful for both hands to be free or where the contents of the cooler make it so heavy that a shoulder strap would be advisable, then a shoulder strap may be employed.

FIG. 5 shows a shoulder strap arrangement (68) adopted for use with the cooler size storage enclosure (5). There are parallel vertical straps (74) and parallel horizontal straps (76) which are connected by cross straps (78). These form a framework on which a cooler equipped with the cooler size storage enclosure could rest. The vertical straps (74) pass through the slits (43) disposed at each end of the cooler size storage enclosure (5). The bottom of the cooler (60) will rest on the horizontal straps (76) and on the cross straps (78) that connect the horizontal straps (76). A triangular shaped strap arrangement (80) connects to the cross strap (78) that connect the vertical straps (74) ending in a mateably lockable clip connection (72) of the type disclosed by Ikeda U.S. Pat. No. 4,800,629. These mateable, lockable, clips (72) are at the ends of the shoulder strap (70). Once the horizontal straps (76) are disposed on the bottom of the cooler (60) and the vertical straps (74) are placed within the slits (43) the shoulder strap (70) is ready for attachment by means of the mateable, lockable clips (72). The cooler may then be carried by means of the shoulder strap (70). It will be appreciated by one of ordinary skill in the art, that arrangement of the straps or the connections between the straps may be varied without departing from the underlying inventive concept.

FIG. 6 shows the storage enclosure (10) sized to fit a can or drink when in place around a can (50). The patch pockets (20) are shown as well as their elasticized tops (21). When the device is made in a rectangular shape with hook and eye fastening means (13) disposed at opposite ends of the rectangular shape, the hook and eye fastening means (13) will meet and mate so as to foldably enclose the drink (50). However, the storage enclosure sized to fit a can or drink could be permanently constructed in a loop shape with an extra elasticized panel (15). In that case, the drink will slide within one open end of the loop shaped device until the storage enclosure (10) is securely fitted around the can (50) and held in place by the elasticized panels (15).

Figure 7:
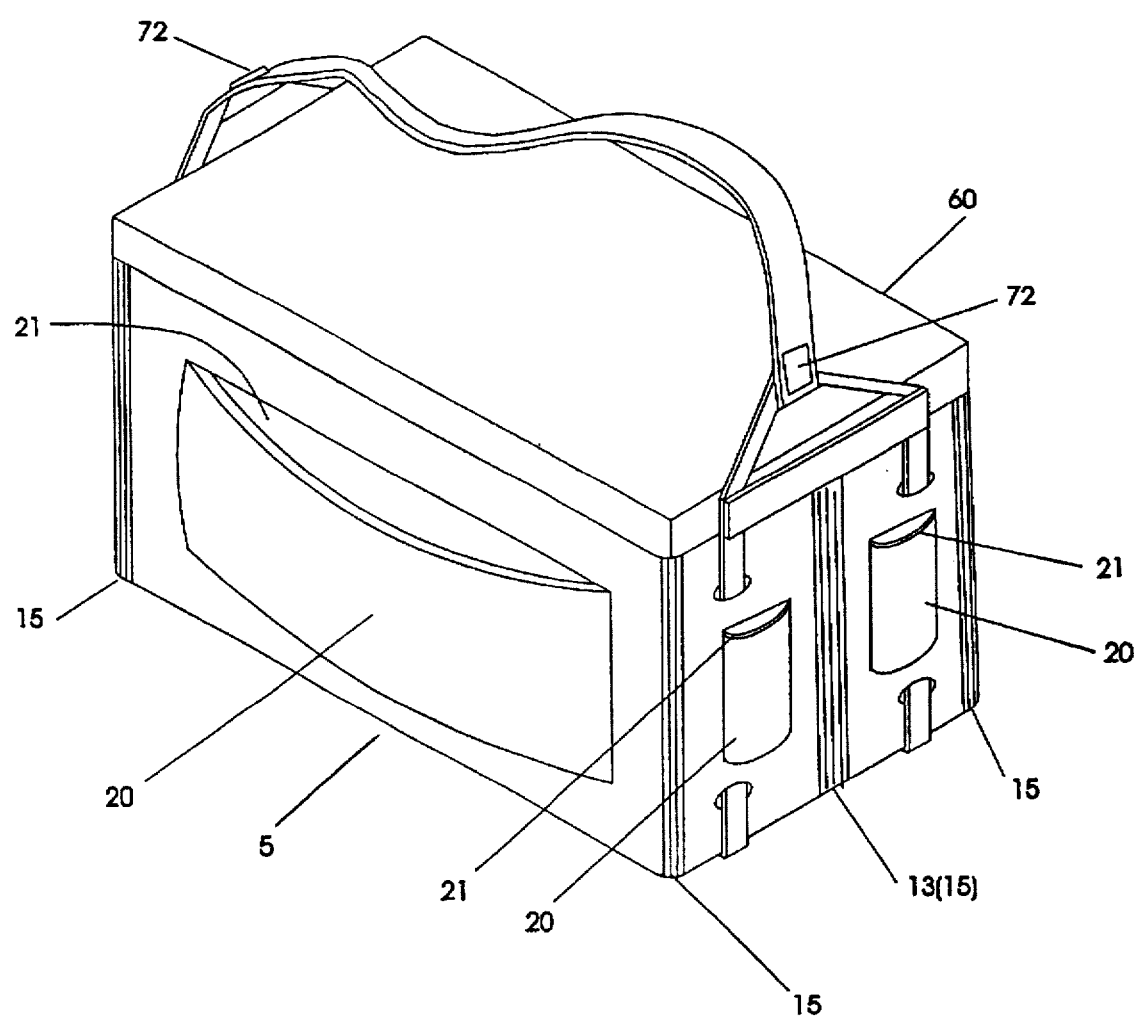
FIG. 7 shows the cooler storage enclosure and shoulder strap arrangement in place around a cooler.

FIG. 7 shows the cooler size storage enclosure in place around a roughly rectangular cooler with a removable top. The shoulder strap arrangement is in place and ready for use in carrying the cooler for hands free transportation. The pockets and elasticized top are seen on two sides of the cooler. The shoulder strap (70) is in place and attached to the strap arrangement by means of mateable clips (72). At one end of the cooler the hook and eye fastening means (13) are connected, attaching the cooler size storage enclosure in place by means of the frictional fit generated by the stretchable elastic panels (15). It may be readily appreciated that the hook and eye fastening means (13) could be replaced by a permanent, stretchable, elasticized panel (15). In that embodiment the storage enclosure would have a loop shape and the cooler would slide within the opening created by the loop before filling of the shoulder strap arrangement and attachment of the shoulder strap.

I claim:

1. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, the enclosure comprising:

an enclosure sized and shaped to complementally enclose the walls of one of the cooler containers;

means for adjusting the size and shape of said enclosure whereby said enclosure may be adjusted to complementally enclose the walls of one of the box-shaped cooler containers and may be adjusted to complementally enclose the walls of another of the box-shaped cooler containers of another size different than the one container; and at least one pocket disposed on a surface of said enclosure distal to any cooler container enclosed within said enclosure, whereby items subject to damage by dampness caused by the coolant material in the container may be carried outside of the container in said pocket.

2. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 1, wherein said means for adjusting is constructing at least a portion of said enclosure of elasticized stretchable material.

3. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 2, wherein said pocket is equipped with an elasticized closeable top.

4. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 3, wherein disposed on a surface of said enclosure distal to any cooler container enclosed within said storage enclosure are means for removably attaching a shoulder strap to said enclosure and a shoulder strap.

5. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 4, wherein said means for attaching said shoulder strap are slits for receipt of straps arranged on a surface of said enclosure distal to any cooler container enclosed therein, a strap arrangement designed to fit within said slits and to support any cooler container enclosed within said storage enclosure, further including means for removably attaching said shoulder strap on said strap arrangement.

6. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 1, wherein said enclosure is formed as a continuous loop whereby a cooler container may be enclosed within said loop.

7. An adjustably sized storage enclosure or use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 6, wherein at said means for adjusting is constructing at least a portion of said enclosure of elasticized stretchable material.

8. An adjustably sized storage enclosure for use with various sized box-shaped cooler containers, each of the containers having insulation, a base having a bottom and upstanding walls extending from the bottom, an openable too and a size sufficient to receive at least six beverage cans therein such that the beverage cans stored therein arc kept at a colder temperature than the ambient temperature surrounding the container by placing the cans into the container with a coolant material as recited in claim 7, wherein said pocket is equipped with an elasticized closeable top.

9. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 8, wherein disposed on a surface of said enclosure distal to any cooler container enclosed within said storage enclosure are means for removably attaching a shoulder strap to said enclosure and a shoulder strap.

10. An adjustably sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 9, wherein said means for attaching a shoulder strap are slits for receipt of straps arranged on a surface of said enclosure distal to any cooler container enclosed therein; a strap arrangement designed to fit within said slits and to support any cooler container enclosed within said storage enclosure; further including means for removably attaching said shoulder strap on said strap arrangement.

11. An adjustable sized storage enclosure for use with various sized box-shaped cooler containers, each of the containers having insulation, a base having a bottom and upstanding walls extending from the bottom, an openable top, and a size sufficient to receive at least six beverage cans therein such that the beverage cans stored therein are kept at a colder temperature than the ambient temperature surrounding the container by placing the cans into the container with a coolant material, as recited in claim 10, wherein said means for removably attaching said shoulder strap on said strap arrangement is a mateable lockable clip.

\* \* \* \* \*